US011914100B2

(12) United States Patent
Cai

(10) Patent No.: US 11,914,100 B2
(45) Date of Patent: Feb. 27, 2024

(54) METHOD FOR DETERMINING THE INVERSE OF GRAVITY CORRELATION TIME

(71) Applicant: SOUTHEAST UNIVERSITY, Nanjing (CN)

(72) Inventor: Tijing Cai, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 217 days.

(21) Appl. No.: 17/421,245

(22) PCT Filed: Jun. 4, 2020

(86) PCT No.: PCT/CN2020/094336
§ 371 (c)(1),
(2) Date: Jul. 7, 2021

(87) PCT Pub. No.: WO2021/120533
PCT Pub. Date: Jun. 24, 2021

(65) Prior Publication Data
US 2022/0120932 A1 Apr. 21, 2022

(30) Foreign Application Priority Data
Dec. 17, 2019 (CN) .......................... 201911303258.8

(51) Int. Cl.
*G01V 7/06* (2006.01)
*G01V 7/00* (2006.01)
*G01V 7/16* (2006.01)

(52) U.S. Cl.
CPC .................. *G01V 7/06* (2013.01); *G01V 7/00* (2013.01); *G01V 7/16* (2013.01)

(58) Field of Classification Search
USPC .......................................................... 702/2
See application file for complete search history.

(56) References Cited

U.S. PATENT DOCUMENTS

| 8,909,496 | B2 * | 12/2014 | Carroll | ..................... | G01V 7/00 |
| | | | | | 702/182 |
| 11,409,020 | B2 * | 8/2022 | Wang | ........................ | G01V 7/06 |
| 2015/0101407 | A1 * | 4/2015 | Liszicasz | ................. | G01V 7/04 |
| | | | | | 73/382 G |
| 2017/0108612 | A1 | 4/2017 | Aguib | | |

FOREIGN PATENT DOCUMENTS

| CN | 102043169 A | 5/2011 |
| CN | 109141436 A | 1/2019 |
| CN | 109212629 A | 1/2019 |

OTHER PUBLICATIONS

Cai Tijing et al., "Kalman Filtering in Strapdown Aviation Gravity Measurement", Piezoelectric and Acousto-Optic , vol. 3, Issue 41, Jun. 30, 2019 (Jun. 30, 2019), pp. 436-439.
Cai Tijing et al., "A Two-Step Correlated Extremum Gravity Matching Algorithm", Piezoelectric and Acousto-Optic , vol. 5, Issue 41, Oct. 31, 2019 (Oct. 31, 2019), pp. 747-751.

* cited by examiner

*Primary Examiner* — Paul D Lee
(74) *Attorney, Agent, or Firm* — Muncy, Geissler, Olds & Lowe, P.C.

(57) ABSTRACT

The present invention discloses a method for determining an inverse of gravity correlation time. During data processing on gravity measurement of moving bases, a gravity anomaly is considered as a stationary random process in a time domain, and is described with a second-order Gauss Markov model, a third-order Gauss Markov model or an $m^{th}$-order Gauss Markov model, and the inverse of gravity correlation time is an important parameter of the gravity-anomaly model, and according to a gravity sensor root mean square error, a Global Navigation Satellite System (GNSS) height root mean square error, an a priori gravity root mean square, and a gravity filter cutoff frequency during the gravity measurement of the moving bases, an inverse of gravity correlation time of the second-order, third-order or $m^{th}$-order Gauss Markov model is determined. According to the method for determining an inverse of gravity correlation time provided in the present invention, a forward and backward Kalman filter during data processing on gravity measurement of moving bases can be adjusted, to obtain a high-precision and high-wavelength-resolution gravity anomaly value.

3 Claims, No Drawings

METHOD FOR DETERMINING THE INVERSE OF GRAVITY CORRELATION TIME

BACKGROUND

Technical Field

The present invention relates to a method for determining an inverse of gravity correlation time and belongs to the field of data processing technologies on gravity measurement of moving bases.

Related Art

Information about Earth's gravity field plays an important role in developing mineral resources exploration, Earth science, and military science and building national defense. Currently, a method for implementing fast measurement of Earth's gravity field is gravity measurement of moving bases, and data obtained from the gravity measurement of the moving bases is processed by using a data processing method for the gravity measurement, to obtain a high-precision and high-resolution gravity field. In the data processing method for the gravity measurement, the design of a filter plays an important role. Currently, a commonly used gravity data filter is a finite impulse response low-pass filter and an infinite impulse response low-pass filter, and a forward and backward Kalman filter is gradually used in gravity data processing. The former filter has an obvious filtering cutoff frequency, and a filtering cutoff frequency of the latter filter has not been reported in the literature.

During the data processing on the gravity measurement of the moving bases, a gravity anomaly is considered as a stationary random process in a time domain, and is described with a second-order Gauss Markov model, a third-order Gauss Markov model or an m-order Gauss Markov model. When the gravity data is processed by gravity-anomaly models, an inverse of gravity correlation time is an important parameter that needs to be determined in advance. So far, a method for determining an inverse of gravity correlation time that is related to a filtering cutoff frequency has not been reported in the literature.

SUMMARY

An objective of the present invention is to resolve the foregoing problems and provide a method for determining an inverse of gravity correlation time.

To achieve the foregoing objective, a technical solution adopted in the present invention is as follows: A method for determining an inverse of gravity correlation time includes the following steps:

A gravity-anomaly Fourier transform of an $m^{th}$-order Markov random model is:

$$\Delta g(i\omega) = \sigma_g \left[ \frac{2(2m-2)!!}{(2m-3)!!} \right]^{1/2} \frac{\beta^{m-1/2}}{(\beta+i\omega)^m} w_0(i\omega), \quad (1)$$

where $\Delta g$ is the gravity-anomaly Fourier transform, $\sigma_g$ is an a priori gravity root mean square, $\beta$ is an inverse of gravity correlation time, $\omega$ is a gravity field frequency, and $w_0(i\omega)$ is a Fourier transform of gravity field random noise.

A gravity-anomaly power spectral density of the $m^{th}$-order Markov random model is:

$$S_{\Delta g}(\omega) = \left[ \frac{2(2m-2)!!}{(2m-3)!!} \right] \frac{\beta^{2m-1}}{(\beta^2+\omega^2)^m} \frac{\sigma_g^2}{2\pi}. \quad (2)$$

A gravity-anomaly error equation during gravity measurement of moving bases is:

$$\Delta \ddot{h} = -\Delta g + \delta f_{UP} \quad (3),$$

where $\Delta h$ is a height error, $\Delta \ddot{h}$ is a second-order derivative of the height error relative to time, and $\delta f_{UP}$ is a vertical accelerometer error.

A height observation equation of a gravity sensor during the gravity measurement of the moving bases is:

$$z = \Delta h + \delta h^{GNSS} \quad (4),$$

where z is an observation value of a Global Navigation Satellite System (GNSS), and $\delta h^{GNSS}$ is a GNSS height measurement error.

A gravity-anomaly estimation filter is:

$$\Delta \tilde{g} = G * y \quad (5),$$

and $$y = -\Delta g + \delta f_{UP} + \delta h^{GNSS} \quad (6)$$

where * is a convolution in a time domain, and G is a linear filter.

When a frequency $\omega$ is equal to a cutoff frequency $\omega_c$, the linear filter G is ½, that is:

$$G(\omega_c) = \frac{1}{2} \quad (7)$$

According to the definition of a power spectral density, a formula may be obtained from Formula (5), Formula (6), and Formula (7) as follows:

$$S_{\Delta g}(\omega_c) = S_f(\omega_c) + \omega_c^4 S_h(\omega_c) \quad (8)$$

where $$S_f(\omega) = \frac{\sigma_f^2}{2\pi}$$

is a noise power spectral density of an accelerometer, $$S_h(\omega) = \frac{\sigma_h^2}{2\pi}$$

is a high-noise power spectral density of the GNSS, $\sigma_f$ is a gravity sensor root mean square error, and $\sigma_h$ is a GNSS height root mean square error.

A formula is obtained by substituting the power spectral densities $S_{\Delta g}(\omega)$, $S_f(\omega)$, and $S_h(\omega)$ into Formula (8), which is expressed as follows:

$$\beta = \left[ (1+\beta^2/\omega_c^2)^m \frac{\omega_c^{2m}}{C_m} \left[ \frac{\sigma_f^2}{\sigma_g^2} + \omega_c^4 \frac{\sigma_h^2}{\sigma_g^2} \right] \right]^{\frac{1}{2m-1}}, \quad (9)$$

where $C_m = \frac{2(2m-2)!!}{(2m-3)!!}$.

When $\beta \ll \omega_c$, Formula (9) is simplified as:

$$\beta \approx \left[\frac{\omega_c^{2m}}{C_m}\left[\frac{\sigma_f^2}{\sigma_g^2} + \omega_c^4 \frac{\sigma_h^2}{\sigma_g^2}\right]\right]^{\frac{1}{2m-1}}. \qquad (10)$$

According to the gravity sensor root mean square error $\sigma_f$, the GNSS height root mean square error $\sigma_h$, the a priori gravity root mean square $\sigma_g$, and the gravity filter cutoff frequency $\omega_c$ during the gravity measurement of the moving bases, iterative calculation is performed by using Formula (9), to obtain the inverse of gravity correlation time $\beta$.

Formula (10) is an explicit expression, and the inverse of gravity correlation time $\beta$ on the left can be obtained by calculating known quantities on the right.

An inverse of gravity correlation time of a gravity anomaly of a second-order Gauss Markov model is determined. According to the gravity sensor root mean square error $\sigma_f$, the GNSS height root mean square error $\sigma_h$, the a priori gravity root mean square $\sigma_g$, and the gravity filter cutoff frequency $\omega_c$ during the gravity measurement of the moving bases, iterative calculation is performed by using Formula (11), to obtain the inverse of gravity correlation time $\beta$.

$$\beta = \left[(1+\beta^2/\omega_c^2)^2 \frac{\omega_c^4}{4}\left[\frac{\sigma_f^2}{\sigma_g^2} + \omega_c^4 \frac{\sigma_h^2}{\sigma_g^2}\right]\right]^{\frac{1}{3}}. \qquad (11)$$

When $\beta \ll \omega_c$, Formula (11) is simplified as:

$$\beta \approx \left[\frac{\omega_c^4}{4}\left[\frac{\sigma_f^2}{\sigma_g^2} + \omega_c^4 \frac{\sigma_h^2}{\sigma_g^2}\right]\right]^{\frac{1}{3}}. \qquad (12)$$

Formula (12) is an explicit expression, and the inverse of gravity correlation time $\beta$ on the left can be obtained by calculating known quantities on the right.

An inverse of gravity correlation time of a gravity anomaly of a third-order Gauss Markov model is determined. According to the gravity sensor root mean square error $\sigma_f$, the GNSS height root mean square error $\sigma_h$, the a priori gravity root mean square $\sigma_g$, and the gravity filter cutoff frequency $\omega_c$ during the gravity measurement of the moving bases, iterative calculation is performed by using Formula (13), to obtain the inverse of gravity correlation time $\beta$:

$$\beta = \left[(1+\beta^2/\omega_c^2)^3 \frac{3\omega_c^6}{16}\left[\frac{\sigma_f^2}{\sigma_g^2} + \omega_c^4 \frac{\sigma_h^2}{\sigma_g^2}\right]\right]^{\frac{1}{5}}. \qquad (13)$$

When $\beta \ll \omega_c$, Formula (13) is simplified as:

$$\beta \approx \left[\frac{3\omega_c^6}{16}\left[\frac{\sigma_f^2}{\sigma_g^2} + \omega_c^4 \frac{\sigma_h^2}{\sigma_g^2}\right]\right]^{\frac{1}{5}}. \qquad (14)$$

Formula (14) is an explicit expression, and the inverse of gravity correlation time $\beta$ on the left can be obtained by calculating known quantities on the right.

Beneficial effects are as follows:

In the method for determining an inverse of gravity correlation time of a gravity anomaly of a second-order Gauss Markov model, a third-order Gauss Markov model or an $m^{th}$-order Gauss Markov model provided in the present invention, a relationship is established between an inverse of gravity correlation time and a filter cutoff frequency being processed by gravity data of moving bases. According to changes in the filter cutoff frequency, a forward and backward Kalman filter during data processing on gravity measurement of the moving bases is adjusted, to obtain a high-precision and high-wavelength-resolution gravity anomaly value.

DETAILED DESCRIPTION

The present invention is further described below with reference to specific embodiments.

This embodiment discloses a method for determining an inverse of gravity correlation time, including the following steps:

S1. According to gravity measurement data of moving bases, a gravity sensor root mean square error $\sigma_f=5.0\times10^{-5}$ m/s$^2$, a GNSS height root mean square error $\sigma_h=0.05$ m, an a priori gravity root mean square $\sigma_g=0.001$ m/s$^2$, and a gravity filter cutoff frequency $\omega_c=\pi/50$ are given.

S2. An inverse of gravity correlation time of a gravity anomaly of an $m^{th}$-order Gauss Markov model is determined. According to S1, the gravity measurement data of the moving bases is calculated by using Formula (15), to obtain the inverse of gravity correlation time $\beta$.

$$\beta = \left[(1+\beta^2/\omega_c^2)^m \frac{\omega_c^{2m}}{C_m}\left[\frac{\sigma_f^2}{\sigma_g^2} + \omega_c^4 \frac{\sigma_h^2}{\sigma_g^2}\right]\right]^{\frac{1}{2m-1}}, \qquad (15)$$

where $C_m = \frac{2(2m-2)!!}{(2m-3)!!}$.

According to S1, the gravity measurement data of the moving bases is calculated by using a simplified Formula (16), to obtain the inverse of gravity correlation time.

$$\beta \approx \left[\frac{\omega_c^{2m}}{C_m}\left[\frac{\sigma_f^2}{\sigma_g^2} + \omega_c^4 \frac{\sigma_h^2}{\sigma_g^2}\right]\right]^{\frac{1}{2m-1}}. \qquad (16)$$

S3. An inverse of gravity correlation time of a gravity anomaly of a second-order Gauss Markov model is determined. According to S1, the gravity measurement data of the moving bases is performed with iterative calculation by using Formula (17), to obtain the inverse of gravity correlation time $\beta=0.005365$ $$\beta = \left[(1+\beta^2/\omega_c^2)^2 \frac{\omega_c^4}{4}\left[\frac{\sigma_f^2}{\sigma_g^2} + \omega_c^4 \frac{\sigma_h^2}{\sigma_g^2}\right]\right]^{\frac{1}{3}}. \qquad (17)$$

According to S1, the gravity measurement data of the moving bases is calculated by using Formula (18), to obtain the inverse of gravity correlation time $\beta=0.005339$, $$\beta \approx \left[\frac{\omega_c^4}{4}\left[\frac{\sigma_f^2}{\sigma_g^2} + \omega_c^4 \frac{\sigma_h^2}{\sigma_g^2}\right]\right]^{\frac{1}{3}}. \tag{18}$$

S4. An inverse of gravity correlation time of a gravity anomaly of a third-order Gauss Markov model is determined. According to S1, the gravity measurement data of the moving bases is performed with iterative calculation by using Formula (19), to obtain the inverse of gravity correlation time β=0.013907.

$$\beta = \left[(1+\beta^2/\omega_c^2)^3 \frac{3\omega_c^6}{16}\left[\frac{\sigma_f^2}{\sigma_g^2} + \omega_c^4 \frac{\sigma_h^2}{\sigma_g^2}\right]\right]^{\frac{1}{5}}. \tag{19}$$

According to S1, the gravity measurement data of the moving bases is calculated by using Formula (20), to obtain the inverse of gravity correlation time β=0.013514.

$$\beta \approx \left[\frac{3\omega_c^6}{16}\left[\frac{\sigma_f^2}{\sigma_g^2} + \omega_c^4 \frac{\sigma_h^2}{\sigma_g^2}\right]\right]^{\frac{1}{5}}. \tag{20}$$

Details not described in this specification belong to the well-known technology of a person skilled in the art. It should be noted that a person of ordinary skill in the art may further make several improvements and equivalent replacements to the present invention without departing from the principle of the present invention. The technical solution with improvements and equivalent replacements in claims of the present invention shall fall within the protection scope of the present invention.

What is claimed is:

1. A method for determining an inverse of gravity correlation time, comprising:

obtaining an observation value using a global navigation satellite system (GNSS);

measuring a gravity of moving bases using a gravity sensor;

for a gravity anomaly of an $m^{th}$ order Gauss Markov model, according to a gravity sensor root mean square error $\sigma_f$, a GNSS height root mean square error $\sigma_h$, an a priori gravity root mean square $\sigma_g$, and a gravity filter cutoff frequency $\omega_c$ during said gravity measurement of moving bases, performing iterative calculation by using Formula (1), to obtain an inverse of gravity correlation time β, the gravity filter comprising an impulse response low-pass filter, $$\beta = \left[(1+\beta^2/\omega_c^2)^m \frac{\omega_c^{2m}}{C_m}\left[\frac{\sigma_f^2}{\sigma_g^2} + \omega_c^4 \frac{\sigma_h^2}{\sigma_g^2}\right]\right]^{\frac{1}{2m-1}}, \tag{1}$$

where $C_m = \frac{2(2m-2)!!}{(2m-3)!!}$;

(2) assuming that β<<$\omega_c$, and simplifying Formula (1) as:

$$\beta \approx \left[\frac{\omega_c^{2m}}{C_m}\left[\frac{\sigma_f^2}{\sigma_g^2} + \omega_c^4 \frac{\sigma_h^2}{\sigma_g^2}\right]\right]^{\frac{1}{2m-1}}, \tag{2}$$

where Formula (2) is an explicit expression, and the inverse of gravity correlation time β on the left can be obtained by calculating known quantities on the right, wherein a relationship is established between the inverse of gravity correlation time and a filter cutoff frequency and according to changes in the filter cutoff frequency, a forward and backward Kalman filter during data processing on a gravity measurement of a moving base is adjusted.

2. The method for determining an inverse of gravity correlation time according to claim 1, comprising: when m=2, performing iterative calculation by using Formula (3), to obtain the inverse of gravity correlation time β:

$$\beta = \left[(1+\beta^2/\omega_c^2)^m \frac{\omega_c^4}{4}\left[\frac{\sigma_f^2}{\sigma_g^2} + \omega_c^4 \frac{\sigma_h^2}{\sigma_g^2}\right]\right]^{\frac{1}{3}}, \tag{3}$$

and

When β<<$\omega_c$, simplifying Formula (3) as:

$$\beta \approx \left[\frac{\omega_c^4}{4}\left[\frac{\sigma_f^2}{\sigma_g^2} + \omega_c^4 \frac{\sigma_h^2}{\sigma_g^2}\right]\right]^{\frac{1}{3}}, \tag{4}$$

where Formula (4) is an explicit expression, and the inverse of gravity correlation time on the left can be obtained by calculating known quantities on the right.

3. The method for determining an inverse of gravity correlation time according to claim 1, comprising: when m=3, performing iterative calculation by using Formula (5), to obtain the inverse of gravity correlation time β:

$$\beta = \left[(1+\beta^2/\omega_c^2)^m \frac{3\omega_c^6}{C_m}\left[\frac{\sigma_f^2}{\sigma_g^2} + \omega_c^4 \frac{\sigma_h^2}{\sigma_g^2}\right]\right]^{\frac{1}{5}}, \tag{5}$$

and

When β<<$\omega_c$, simplifying Formula (5) as:

$$\beta \approx \left[\frac{3\omega_c^6}{16}\left[\frac{\sigma_f^2}{\sigma_g^2} + \omega_c^4 \frac{\sigma_h^2}{\sigma_g^2}\right]\right]^{\frac{1}{5}}, \tag{6}$$

where Formula (6) is an explicit expression, and the inverse of gravity correlation time β on the left can be obtained by calculating known quantities on the right.

\* \* \* \* \*